US011219009B2

(12) United States Patent
Baldemair et al.

(10) Patent No.: US 11,219,009 B2
(45) Date of Patent: *Jan. 4, 2022

(54) METHOD AND APPARATUS FOR IDENTIFYING AND USING RADIO RESOURCES IN A WIRELESS COMMUNICATION NETWORK

(71) Applicant: Telefonaktiebolaget LM Ericsson (publ), Stockholm (SE)

(72) Inventors: Robert Baldemair, Solna (SE); Bengt Lindoff, Bjärred (SE); Stefan Parkvall, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/710,406

(22) Filed: Dec. 11, 2019

(65) Prior Publication Data

US 2020/0120648 A1 Apr. 16, 2020

Related U.S. Application Data

(63) Continuation of application No. 15/580,410, filed as application No. PCT/SE2017/051081 on Nov. 2, 2017, now Pat. No. 10,555,291.

(Continued)

(51) Int. Cl.
*H04W 72/04* (2009.01)
*H04W 76/27* (2018.01)
*H04W 80/02* (2009.01)

(52) U.S. Cl.
CPC ......... *H04W 72/042* (2013.01); *H04W 72/04* (2013.01); *H04W 72/0453* (2013.01); *H04W 76/27* (2018.02); *H04W 80/02* (2013.01)

(58) Field of Classification Search
CPC ........... H04W 72/042; H04W 72/0453; H04W 76/27; H04W 80/02; H04W 72/04
See application file for complete search history.

(56) References Cited

U.S. PATENT DOCUMENTS 10,588,120 B2 * 3/2020 Baldemair ........ H04W 72/0453
2010/0279628 A1 11/2010 Love et al.
(Continued)

FOREIGN PATENT DOCUMENTS

JP 2013539268 A 10/2013
JP 2017517160 A 6/2017
(Continued)

OTHER PUBLICATIONS

"Discussion on resource block for NR", 3GPP TSG RAN WG1 Meeting #86bis, R1-1609429, Huawei, HiSilicon, Lisbon, Portugal, Oct. 10-14, 2016, 5 pages.

*Primary Examiner* — Kashif Siddiqui
(74) *Attorney, Agent, or Firm* — Murphy, Bilak & Homiller, PLLC

(57) ABSTRACT

A network node, such as a base station, identifies radio resources within an overall bandwidth using a first resource referencing scheme, while a wireless communication device identifies radio resources within an allocated portion of the overall bandwidth using a second resource referencing scheme. Advantageously, the device correctly identifies given radio resources pointed to by a resource identifier expressed according to the first resource referencing scheme, by translating the resource identifier into the second resource referencing scheme according to mapping information that relates the two schemes. Correspondingly, the network node enables the wireless communication device to perform such translations by providing the mapping information either implicitly or explicitly.

10 Claims, 11 Drawing Sheets

Related U.S. Application Data

(60) Provisional application No. 62/417,565, filed on Nov. 4, 2016.

(56) References Cited

U.S. PATENT DOCUMENTS

| | | | |
|---|---|---|---|
| 2010/0331030 A1 | 12/2010 | Nory et al. | |
| 2012/0113804 A1 | 5/2012 | Zhang | |
| 2012/0113904 A1 | 5/2012 | Anderson et al. | |
| 2013/0064215 A1* | 3/2013 | Gao | H04L 5/0023 370/330 |
| 2013/0114419 A1 | 5/2013 | Chen et al. | |
| 2013/0155997 A1 | 6/2013 | Cai et al. | |
| 2013/0242904 A1* | 9/2013 | Sartori | H04L 5/0053 370/329 |
| 2014/0254438 A1 | 9/2014 | Long | |
| 2015/0181572 A1 | 6/2015 | Guo et al. | |
| 2015/0271846 A1 | 9/2015 | Kowalski et al. | |
| 2015/0271849 A1 | 9/2015 | Gao | |
| 2016/0007341 A1 | 1/2016 | Nogami et al. | |
| 2016/0020879 A1* | 1/2016 | Shimezawa | H04W 72/04 370/329 |
| 2016/0028521 A1 | 1/2016 | Shimezawa et al. | |
| 2016/0295558 A1 | 10/2016 | Hussain et al. | |
| 2017/0055226 A1 | 2/2017 | Park | |
| 2017/0085355 A1 | 3/2017 | Hayashi et al. | |
| 2018/0054800 A1 | 2/2018 | Yeo et al. | |
| 2018/0132137 A1* | 5/2018 | Dai | H04W 28/18 |
| 2018/0132282 A1 | 5/2018 | Ly et al. | |
| 2018/0167920 A1* | 6/2018 | Kim | H04L 5/0048 |
| 2018/0288779 A1* | 10/2018 | Dai | H04L 1/1812 |
| 2018/0351720 A1* | 12/2018 | Ouchi | H04W 16/14 |
| 2020/0314747 A1* | 10/2020 | Zhou | H04L 5/0044 |

FOREIGN PATENT DOCUMENTS

| | | |
|---|---|---|
| JP | 2019536343 A | 12/2019 |
| RU | 2474087 C2 | 1/2013 |
| WO | 2015138446 A1 | 9/2015 |

* cited by examiner

METHOD AND APPARATUS FOR IDENTIFYING AND USING RADIO RESOURCES IN A WIRELESS COMMUNICATION NETWORK

RELATED APPLICATIONS

This application is a continuation of U.S. application Ser. No. 15/580,410 filed 7 Dec. 2017, which is a U.S. National Phase Application of PCT/SE2017/051081 filed 2 Nov. 2017, which claims benefit of Provisional Application No. 62/417,565 filed 4 Nov. 2016. The entire contents of each aforementioned application is incorporated herein by reference.

TECHNICAL FIELD

The present invention generally relates to wireless communication networks, and particularly relates to identifying and using radio resources in such networks.

BACKGROUND

In wireless communication networks based on the Long Term Evolution (LTE) standards, it is known for a wireless communication device to operate with a downlink bandwidth that matches the downlink bandwidth used by the supporting network base station, at least with respect to a given downlink carrier. In this context, the Third Generation Partnership Project (3GPP) refers to wireless communication devices as "User Equipments" or "UEs" and refers to base stations as "eNodeBs" or "eNBs."

In LTE, a "resource block" or "RB" is the smallest unit of radio resources that can be allocated to a user and it "contains" a defined number of Orthogonal Frequency Division Multiplex (OFDM) subcarriers over a defined interval. Thus, the overall bandwidth used on the DL may be expressed in terms of the number of resource blocks spanned by that bandwidth. Any particular set or sets of subcarriers within a given interval may be identified by identifying the corresponding RB number or numbers. That is, the network may number the DL RBs starting with a lowest number for the lowest frequency, or vice versa, and sequentially number the RBs going up or down from that starting point. Of course, other numbering schemes may be used.

In a non-limiting example, bandwidth is measured in the number of RBs, where each RB corresponds to a fixed number of OFDM subcarriers. The number could be one, two, twelve, twenty-six or any other number. Without loss of generality, one may assume that a base station in the wireless communication network counts or references its downlink radio resources in terms of RBs, e.g., starting with a low RB number for a low frequency and a higher RB number for a higher frequency. Of course, the opposite order may be used. In either case, a base station numbers the RBs comprising its overall downlink bandwidth using a numbering scheme, where each number identifies or points to a particular RB within the downlink bandwidth.

In LTE, User Equipments (UEs) are configured to process the downlink bandwidth used by their supporting eNBs, at least on a per-carrier basis. Because the UE operates with the same bandwidth as the eNB, at least with respect to individual carriers, the UE had the same "view" of the radio resources and the same resource numbering scheme could be used in common between the eNB and the UE. Consequently, a resource pointer transmitted by the eNB using its numbering scheme can be received and interpreted by the UE without ambiguity.

However, it is appreciated herein that resource identification becomes decidedly more challenging to manage in new radio systems, also referred to as "5G" radio systems, which are being developed and deployed. In such radio systems, a given UE may support or be allocated only a subset of the overall downlink bandwidth associated with a network base station, and the location or position of the allocation within the overall downlink bandwidth may vary. By way of example, see TS 38.801, Study on New Radio Access Technology.

As a further complication appreciated herein, in LTE, Physical Downlink Control Channels (PDCCHs) are potentially transmitted over the entire (downlink) bandwidth, which requires individual UEs to monitor for PDCCH over the entire bandwidth. However, with new radio systems, there is a wish to reduce the bandwidth of the PDCCH space. One bandwidth reduction approach involves allocating a limited sub-band of the overall downlink bandwidth for sending downlink control signaling (in one or a few OFDM symbols).

This small allocation would represent a "common" PDCCH search space to be monitored by all UEs supported by the base station. There may also be a need to configure UE-specific search spaces within the bandwidth allocations made for respective ones of the UEs. Such search spaces may or may not overlap with the common search space, and it will be appreciated that UE-specific search spaces can be configured for each UE by assigning specific RBs within the UE's allocated bandwidth.

When sending a UE-specific message to a given UE, the base station could express resource pointers or other resource identifiers using the resource numbering scheme of the UE. However, consider a PDCCH or other control message that includes a resource pointer or other resource identifier and is intended for more than one UE, e.g., potentially many UEs. The multiple UEs do not necessarily have the same configured bandwidths or the same starting or reference locations for their configured bandwidths within the overall downlink bandwidth. Hence, there is no numbering scheme commonly applicable to the base station and the multiple UEs. Such control messages include, for example, random access response messages, system information related messages, paging messages, broadcast service related messages (like MBMS) etc.

These control messages may contain a reference to a data region where more control content can be found, a pointer to the RBs where, for example, the system info can be found. It is appreciated herein that such a pointer or resource identifier expressed using the resource numbering scheme of the base station will be interpreted differently by UEs having different configured bandwidths or bandwidth positions within the overall downlink bandwidth.

To better appreciate the preceding problem, consider FIG. 1, where the overall downlink bandwidth of interest includes RBs numbered from 0 to 26 by the base station, (N−1)=26. A first UE, denoted as UE 1, operates in an allocated subset of the overall downlink bandwidth and numbers RBs within its allocated bandwidth using a numbering scheme going from 0 to (M1−1)=9. However, "0" within the numbering scheme used by the UE 1 corresponds to "10" within the numbering scheme used by the base station. Similarly, a second UE, denoted as UE 2, operates in another allocated subset of the overall downlink bandwidth and numbers RBs within its allocated bandwidth using a numbering scheme going from 0 to (M2−1)=14. However, "0" within the numbering scheme used by the UE 2 corresponds to "3" within the numbering scheme used by the base station. Note that M1 and M2 are less than or equal to N.

Now consider FIG. 2, which shows a common PDCCH message in RB 10. Of course, it should be appreciated that a PDCCH might in practice span several RBs and the format of the PDCCH message in this example context is not important. What is important is that the PDCCH is intended for more than one UE and includes a resource identifier pointing to a data region (i.e., particular downlink resources) that the UEs should access for further content.

Assume that the data region is located in RBs 12-14 according to the BS numbering. Those same RBs are, however, numbered as RBs 2-4 according to the UE 1 numbering, and are numbered as RBs 9-11 according to the UE 2 numbering. A tempting solution to these numbering differences is to force all UEs to use the same numbering scheme as used by the base station. As recognized herein, however, such an approach has a multiplicity of disadvantages. For example, identifying resources within a smaller number space requires fewer bits than are required for identifying the same resources within a larger number space. Hence, forcing each UE to operate with the larger reference numbering space of the base station forfeits the opportunity to use more efficient resource identifiers for identifying UE-specific resources within the allocated bandwidth associated with a given UE.

SUMMARY

A network node, such as a base station, identifies radio resources within an overall bandwidth using a first resource referencing scheme, while a wireless communication device identifies radio resources within an allocated portion of the overall bandwidth using a second resource referencing scheme. Advantageously, the device correctly identifies given radio resources pointed to by a resource identifier expressed according to the first resource referencing scheme, by translating the resource identifier into the second resource referencing scheme according to mapping information that relates the two schemes. Correspondingly, the network node enables the wireless communication device to perform such translations by providing the mapping information either implicitly or explicitly.

One example embodiment involves a method of operation in a wireless communication device configured for operation in a wireless communication network. The method includes receiving a resource identifier from a network node in the wireless communication network, and using the resource identifier to identify a corresponding radio resource within an allocated bandwidth of the wireless communication device, if the resource identifier was received in a device-specific message. Alternatively, according to the method, the wireless communication device translates the resource identifier and uses the translated resource identifier to identify the corresponding resource within the allocated bandwidth of the user equipment, if the resource identifier was not received in a device-specific message. In either case, the method further includes the wireless communication device transmitting or receiving on the corresponding radio resource.

In the above context, resource identifiers not received in device-specific messages comprise values expressed in a first resource referencing scheme that is referenced to an overall bandwidth and resource identifiers received in device-specific messages comprise values expressed in a second resource referencing scheme that is referenced to the allocated bandwidth of the wireless communication device. Correspondingly, translating resource identifiers expressed using the first resource referencing scheme comprises using mapping information that relates the first resource referencing scheme to the second resource referencing scheme.

In a related example embodiment, a wireless communication device includes communication circuitry configured for wireless communication in a wireless communication network and processing circuitry operatively associated with the communication circuitry. The processing circuitry is configured to receive, via the communication circuitry, a resource identifier from a network node in the wireless communication network, and to use the resource identifier to identify a corresponding radio resource within an allocated bandwidth of the wireless communication device, if the resource identifier was received in a device-specific message. However, if the resource identifier was not received in a device specific message, the processing circuitry is configured to translate the resource identifier and use the translated resource identifier to identify the corresponding resource within the allocated bandwidth of the wireless communication device. Still further, the processing circuitry is configured to transmit or receive on the corresponding radio resource, via the communication circuitry.

In the above context, resource identifiers not received in device-specific messages comprise values expressed in a first resource referencing scheme that is referenced to an overall bandwidth, and resource identifiers received in device-specific messages comprise values expressed in a second resource referencing scheme that is referenced to the allocated bandwidth of the wireless communication device. Correspondingly, the processing circuitry is configured to translate resource identifiers expressed using the first resource referencing scheme by using mapping information that relates the first resource referencing scheme to the second resource referencing scheme.

Another example embodiment involves a method of operation in a network node that is configured for operation in a wireless communication network. The method includes transmitting a resource identifier in a message that is not specific to a wireless communication device operating with an allocated bandwidth, where the resource identifier identifies a radio resource to be used by the wireless communication device and is expressed according to a first resource referencing scheme that is referenced to an overall bandwidth that contains the allocated bandwidth. The method further includes providing mapping information to the wireless communication device that enables the wireless communication device to translate the resource identifier from the first resource referencing scheme into a second resource referencing scheme that is used by the wireless communication device for referencing radio resources within the allocated bandwidth. The network node provides the mapping information to the wireless communication device either explicitly, e.g., via explicit signaling, or implicitly, e.g., based on allocating the allocated bandwidth at an offset or position within the overall bandwidth that is associated with a corresponding mapping function known to the wireless communication device.

In a related example, a network node is configured for operation in a wireless communication network and comprises communication circuitry and associated processing circuitry. The processing circuitry is configured to transmit a resource identifier in a message that is not specific to a wireless communication device operating with an allocated bandwidth. The resource identifier identifies a radio resource to be used by the wireless communication device and is expressed according to a first resource referencing scheme that is referenced to an overall bandwidth that contains the allocated bandwidth.

The processing circuitry is further configured to provide mapping information to the wireless communication device that enables the wireless communication device to translate the resource identifier from the first resource referencing scheme into a second resource referencing scheme that is used by the wireless communication device for referencing radio resources within the allocated bandwidth. The processing circuitry provides the mapping information either explicitly or implicitly. For example, as noted above, there may be an association between mapping functions and the positioning of the allocated bandwidth within the overall bandwidth, such that the device knows the mapping function to use based on the offset or position of its allocated bandwidth.

Of course, the present invention is not limited to the above features and advantages. Those of ordinary skill in the art will recognize additional features and advantages upon reading the following detailed description, and upon viewing the accompanying drawings.

DETAILED DESCRIPTION

Figure 1:
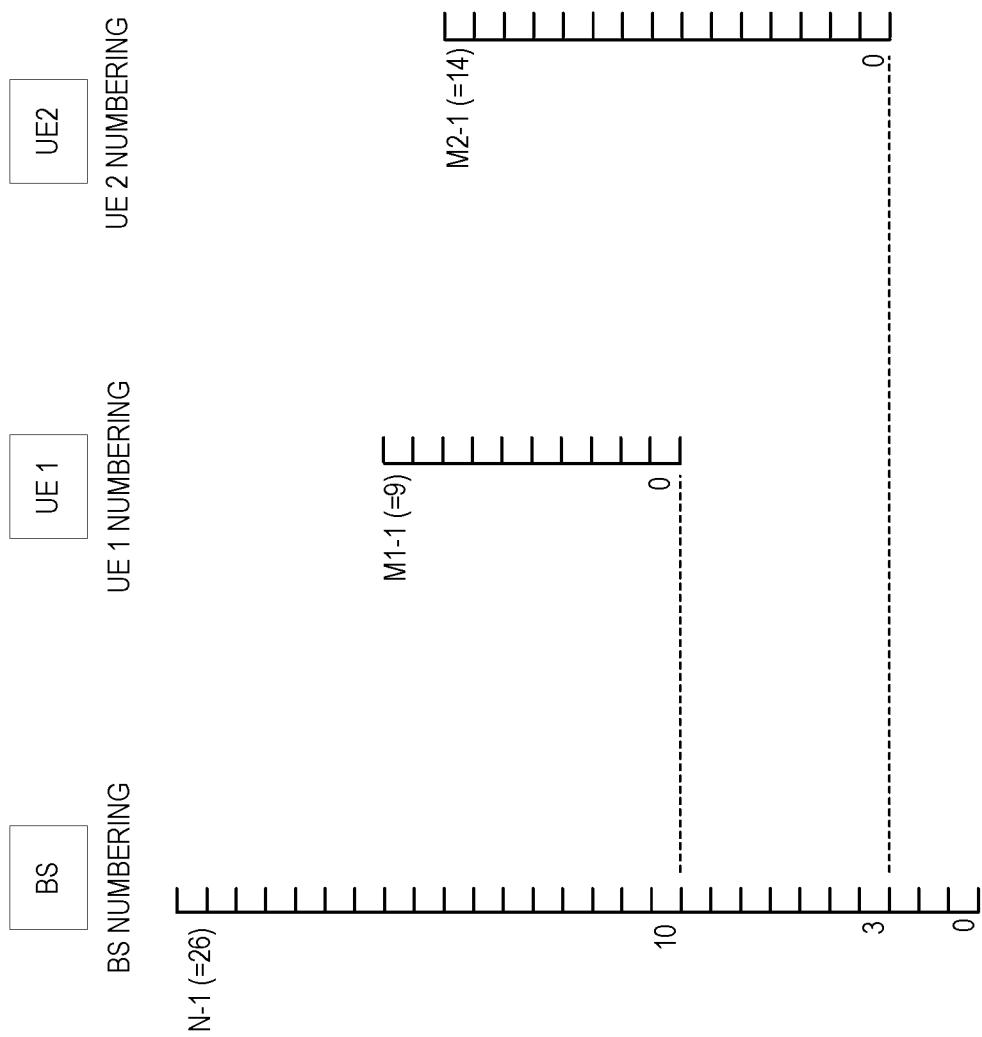
FIGS. 1 and 2 are diagrams of example bandwidth allocations to respective wireless communication devices operating within an overall downlink bandwidth associated with a network base station.
Figure 2:
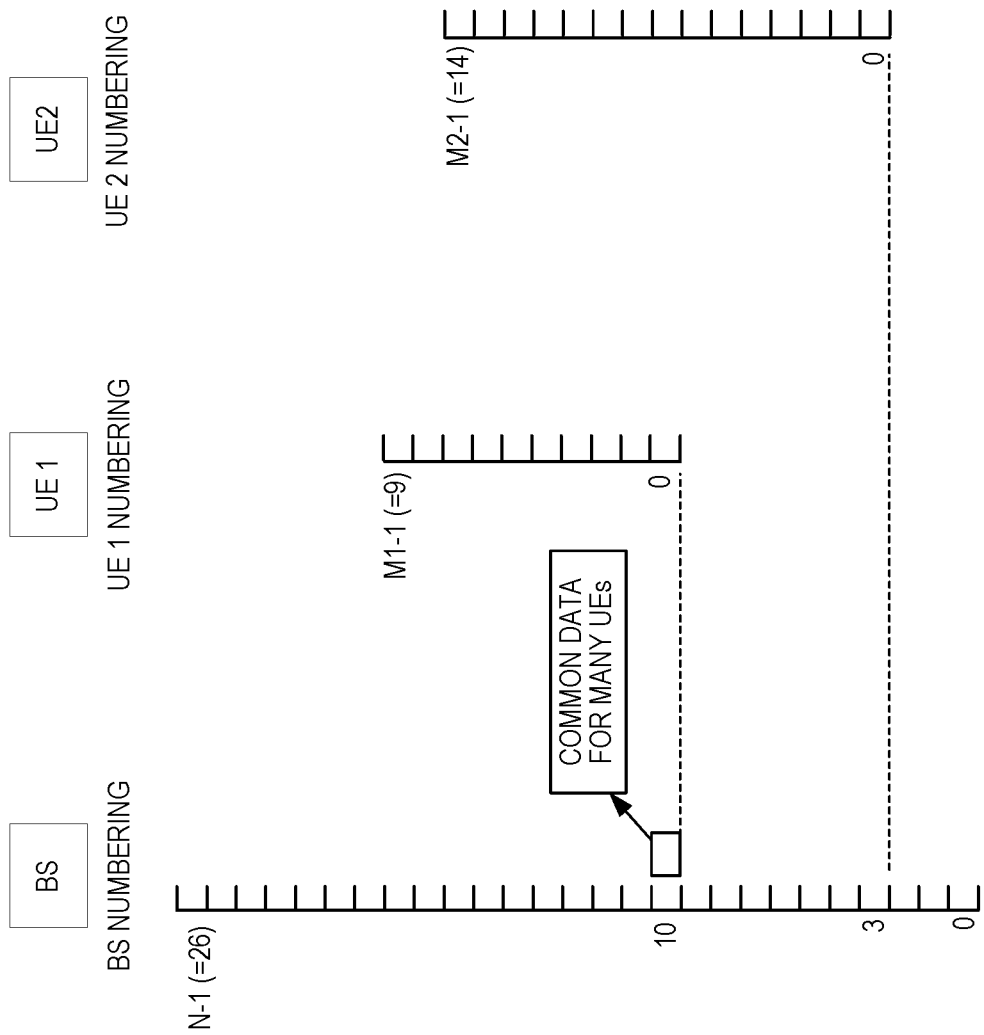
Figure 3:
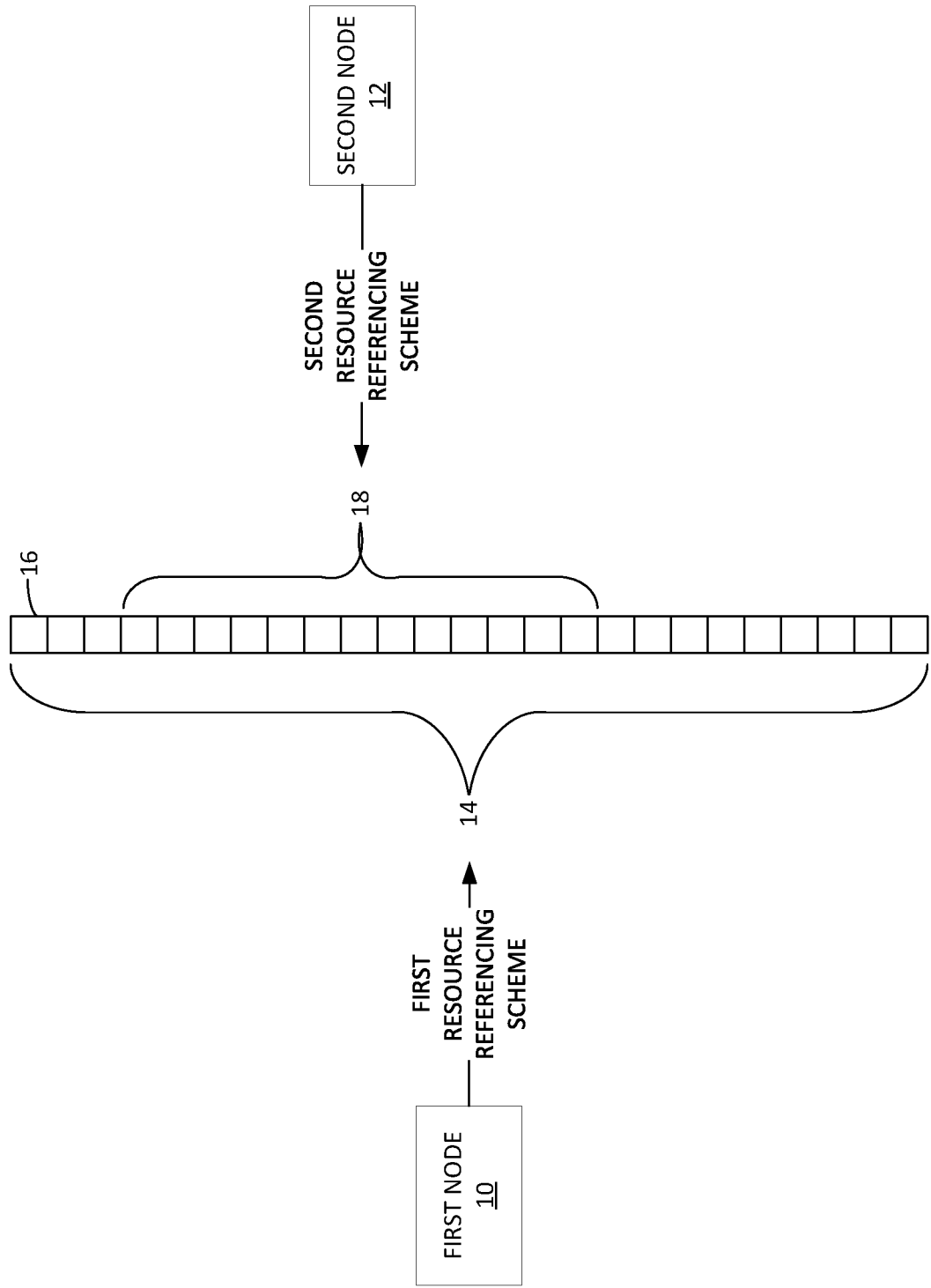
FIG. 3 is a block diagram of one embodiment of first and second nodes configured according to the teachings herein.

FIG. 3 illustrates a first node 10 and a second node 12. The nodes 10 and 12 are configured for operation in a wireless communication network, e.g., a cellular communications network. As a non-limiting example, the first node 10 comprises a network node operating within a wireless communication network and the second node 12 comprises a wireless communication device operating within the network. By way of example, the network node comprises a radio access node, such as a base station of the network, and the second node 12 comprises a User Equipment (UE) or other wireless communication device configured for communicating with the base station. However, the methods contemplated herein have broader applicability to various kinds of nodes and systems where different numbering or identification schemes may be used by different nodes, with respect to at least some of the same communication resources.

In FIG. 3, a set 14 of radio resources 16 are associated with the first node 10. For example, the set 14 of radio resources 16 comprises a set of frequency resources, such as a set of subcarriers or resource blocks (RBs), each comprising one or more subcarriers. The set 14 of radio resources 16 may comprise the overall set of RBs defined for an OFDM carrier. Regardless, the first node 10 uses a first resource referencing scheme for identifying resources 16 within the overall set 14, also referred to as an "overall bandwidth". For example, the first node 10 uses numbers within a first number space large enough to uniquely identify all resources 16 within the set 14.

The second node 12 is allocated or otherwise associated with a subset 18 of the resources 16, and it uses a second resource referencing scheme for identifying resources 16 within the subset 18, also referred to as an "allocated bandwidth". To the extent that the subset 18 does not encompass the full set 14 of resources 16, the second node 12 may use a smaller number space or more compact referencing scheme, which has the advantage of requiring fewer bits to identify resources 16 within the subset 18, but which has the disadvantage of diverging from the referencing scheme used by the first node 10.

However, the first and second nodes 10 and 12 are configured to obviate the issues arising from using different resource referencing schemes, where such configuration enables the second node 12 to accurately identify a radio resource 16 within its subset 18 of resources 16, even when the resource is identified by the first node 10 using the first resource referencing scheme. In one example of such reconciliation of the two schemes, a method of operation by the second node 12 includes receiving a first resource identifier from the first node 10, where the first resource identifier is expressed using the first resource referencing scheme. While the first resource identifier identifies a radio resource that falls within the subset 18, the first resource identifier points to or otherwise identifies the radio resource using a value referenced to resource identification within the full set 14. Therefore, the second node 12 translates the first resource identifier into a second resource identifier—also referred to as a "translated" resource identifier using mapping information that relates the first resource referencing scheme to the second resource referencing scheme. The translated resource identifier points to the same radio resource pointed to by the first resource identifier, but its value is expressed in terms of the second resource referencing scheme. The method further includes transmitting or receiving on the corresponding radio resource, i.e., the radio resource identified by the translated resource identifier. (Here, it will be appreciated that the transmitting or receiving via the resource involves one or more defined transmission time intervals or instants, e.g., slots, subframes, depending on the details of the air interface.)

The method may further include the second node 12 receiving a resource identifier from the first node 10 that is expressed in terms of the second resource referencing scheme. Thus, no translation is required and the second node 12 uses the resource identifier without translation, to identify the corresponding radio resource within the allocated subset 18. Again, the second node 12 transmits or receives on the corresponding radio resource. In other words, for resource identifiers expressed in the second resource referencing scheme, the second node 12 does not apply the mapping function—i.e., does not perform translation—and instead uses them directly.

Thus, the second node 12 may be understood as selectively translating received resource identifiers. For example, the first node 10 may from time to time send messages that are not specifically targeted to the second node 12, e.g., they may be targeted to multiple such nodes, each having a respectively allocated subset 18. In such messages, the first node 10 expresses any included resource identifiers using the first resource referencing scheme which is "common" or "global" to the overall or full set 14 of resources 16. Further, the first node 10 may from time to time send messages that are specifically targeted to the second node 12, and any resource identifiers included in such messages may be expressed using the second resource referencing scheme in use by the second node 12. Put another way, when sending resource identifiers that have to be interpreted by multiple nodes, with each such node having a potentially different allocated subset 18 of resources 16 and using a correspondingly tailored resource referencing scheme, the node 10 uses the first resource referencing scheme to express resource identifiers and relies on the respective receiving nodes to perform the needed translations. When sending resource identifiers targeted to a specific node, however, the node 10 may use the particular resource referencing scheme applicable to that specific node.

Figure 4:
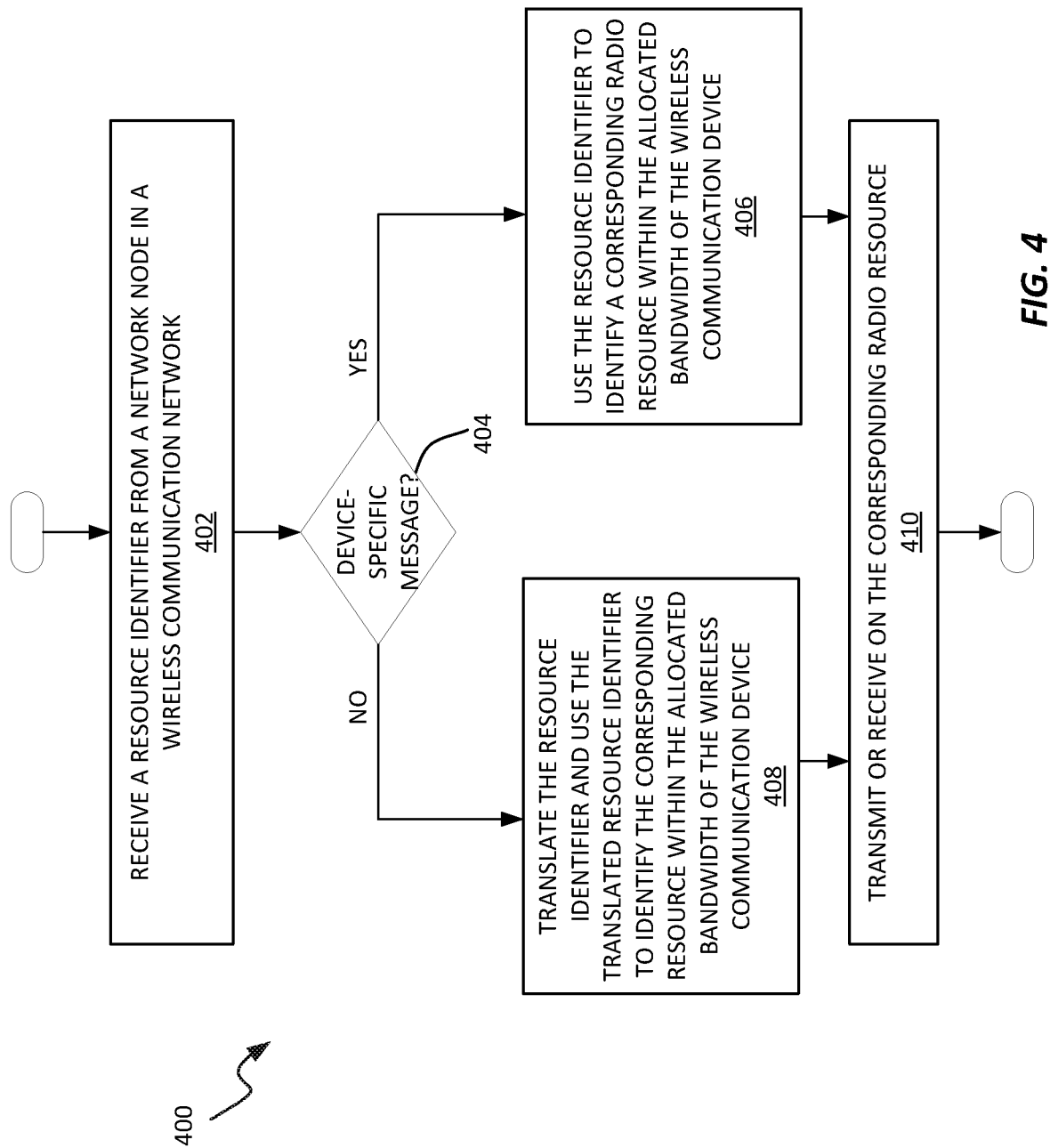
FIG. 4 is a logic flow diagram of one embodiment of processing at a User Equipment (UE) according to the teachings herein.

FIG. 4 illustrates a method 400 according to preceding example. The method 400 is performed by a User Equipment (UE) or other wireless communication device operating in a wireless communication network and includes receiving (block 402) a resource identifier from a network node in the wireless communication network. The method 400 continues with using (block 406) the resource identifier to identify a corresponding radio resource within an allocated bandwidth of the wireless communication device, if the resource identifier was received in a device-specific message (yes from block 404). However, if the resource identifier was not received in a device specific message (no from block 404), the method includes performing the operations of block 408 rather than block 406; namely, the wireless communication device translates the resource identifier and uses the translated resource identifier to identify the corresponding resource within the allocated bandwidth of the wireless communication device. In either case, the resource identifier or translated resource identifier identify the same corresponding radio resource and the method 400 further includes transmitting or receiving on the corresponding radio resource (block 410).

In the context of the method 400, resource identifiers not received in device-specific messages comprise values expressed in a first resource referencing scheme that is referenced to an overall bandwidth—e.g., the full set 14 of resources 16—and resource identifiers received in device-specific messages comprise values expressed in a second resource referencing scheme that is referenced to the allocated bandwidth of the wireless communication device—e.g., the allocated subset 18 of resources 16. Thus, translating resource identifiers expressed using the first resource referencing scheme comprises the wireless communication device using mapping information that relates the first resource referencing scheme to the second resource referencing scheme.

In at least some embodiments, the resource identifier received by the wireless communication device references, as said corresponding radio resource, a radio resource region or a set of radio resources according to the first resource referencing scheme. Correspondingly, the translated resource identifier references the radio resource region or the set of radio resources according to the second resource referencing scheme.

In one example, the first resource referencing scheme comprises a first numbering space used for numbering radio resources within the overall bandwidth, and the second resource referencing scheme comprises a second numbering space used for numbering radio resources within the allocated bandwidth. Correspondingly, the wireless communication device translates a resource identifier from the first resource referencing scheme to the second resource referencing scheme by translating from the first numbering space into the second numbering space according to a defined mapping function. Here, the defined mapping function constitutes the mapping information mentioned above and relates numbers from the first numbering space to corresponding numbers from the second numbering space.

Receiving the resource identifier at the wireless communication device comprises, for example, receiving a downlink control message transmitted by a base station in the wireless communication network on radio resources within a common search space used for sending downlink control messages to multiple wireless communication devices. Correspondingly, the wireless communication device determines that the resource identifier was not received in a device-specific message and, therefore, requires translation.

The wireless communication device may receive the mapping information from the network. For example, the wireless communication device receives the mapping information via explicit signaling sent from the network to the wireless communication device. Alternatively, the network may provide the mapping information to the wireless communication device implicitly. For example, in one or more embodiments, the position or offset of the allocated bandwidth within the overall bandwidth indicates the mapping function that the wireless communication device should use for translating resource identifiers from the first resource referencing scheme into the second resource referencing scheme. In such embodiments, a node in the wireless communication network can provide the mapping information to the wireless communication device implicitly, by sending configuration information defining the allocated bandwidth.

Thus, in one or more embodiments, the wireless communication device receives the mapping information in conjunction with receiving configuration information defining the allocated bandwidth, where the bandwidth allocation implicitly indicates the mapping or where the configuration information includes an explicit indication of the mapping. In other embodiments, the mapping information comes separately from the bandwidth allocation.

In any case, in at least some embodiments, the corresponding radio resource identified by a resource identifier received by the wireless communication device belongs to a set of radio resources pointed to by the resource identifier. The set of radio resources carry data or control information, and the wireless communication device uses the resource identifier, or the corresponding translated resource identifier, to identify the set of radio resources. Once the set of radio resources is identified, the wireless communication device decodes the data or control information conveyed on them. Alternatively, the wireless communication device uses the identified radio resources for one or more transmissions by the device.

Figure 5:
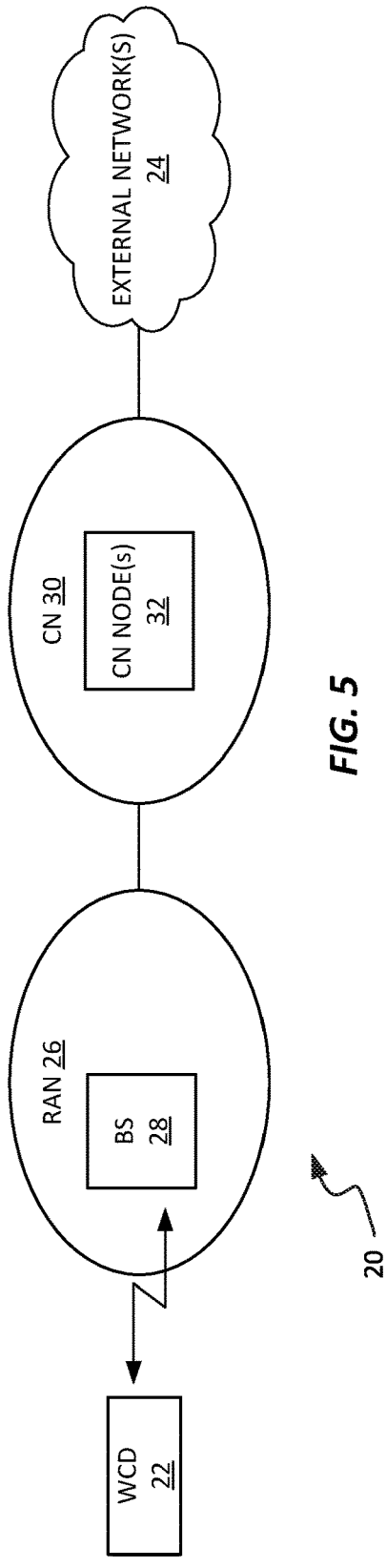
FIG. 5 is a block diagram of one embodiment of a wireless communication network having a network node configured according to the network-side teachings herein, and shown in context with a wireless communication device configured according to the complementary device-side teachings herein.

FIG. 5 illustrates one embodiment of a wireless communication network 20 ("network 20") that provides one or more communication services to a wireless communication device 22 ("WCD 22" or "device 22"), such as by communicatively coupling the device 22 to one or more external networks 24. Example external networks 24 include the Internet or other Packet Data Networks (PDNs). The network 20 includes a Radio Access Network (RAN) 26 including one or more network nodes 28, which may be referred to as base stations, access points, etc. A Core Network (CN) 30 provides, e.g., mobility management and packet routing for the device 22, and includes one or more CN nodes 32, such as packet gateways, mobility management entities, authentication servers, etc.

The diagram shall be understood as being simplified, as the network 20 may include multiple other nodes of the same or different types, and may include multiple base stations 28 and may include more than one RAN and may operate with more than one Radio Access Technology (RAT). In one example, different types of base stations 28 provide a heterogenous radio access network, which may involve more than one RAT. Further, in the context of 5G implementations, the network 20 may use beamforming, e.g., wherein allocated beams within a potentially large plurality of beams from one or more base stations 28 are used to provide coverage to the device 22.

Still further, unless otherwise noted, the terms "device," "wireless communication device," "user equipment," and "UE" are used interchangeably herein. Unless otherwise specified, a wireless communication device comprises essentially any apparatus configured for wirelessly connecting to the network 20 via any one or more of the Radio Access Technologies (RATs) used by the network 20. A wireless communication device may be mobile, although fixed devices are also contemplated, and non-limiting examples include cellular radiotelephones, which may be smartphones or feature phones, laptops, tablets, wireless modems or adaptors, Machine-to-Machine (M2M) or Machine-Type-Communication (MTC) devices, Internet-of-Things (IoT) devices, etc.

Figure 6:
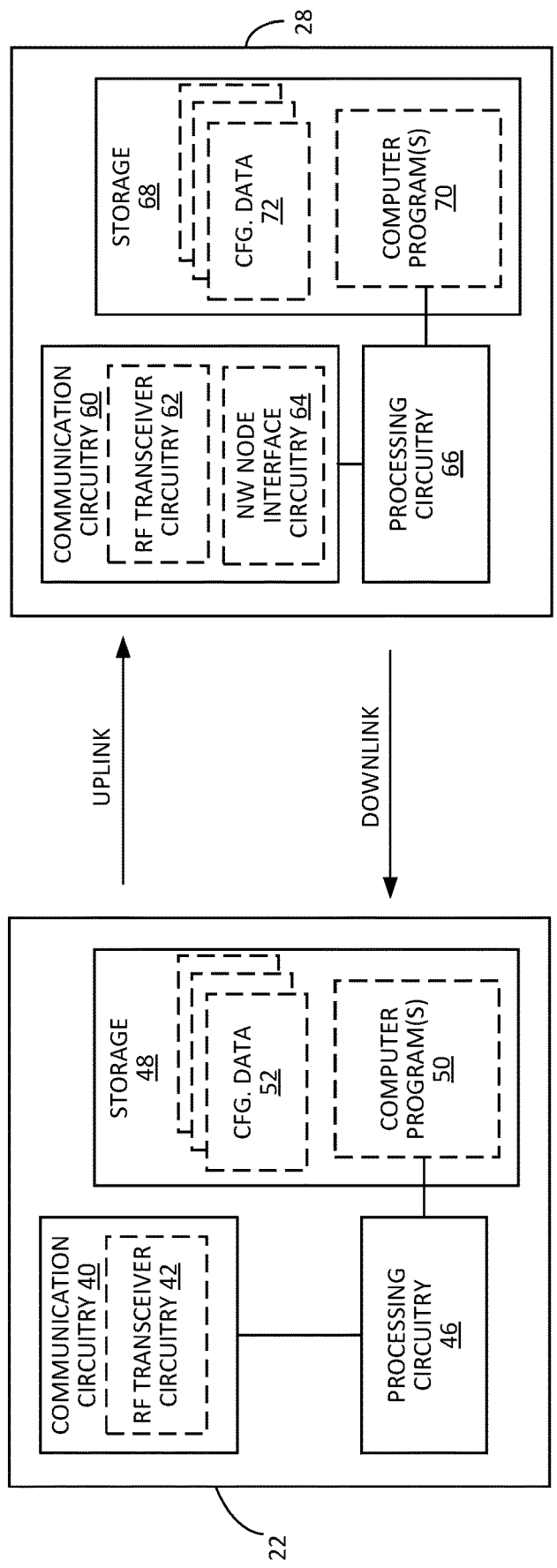
FIG. 6 is a block diagram of example circuitry details for the network node and wireless communication device introduced in FIG. 5.

FIG. 6 illustrates example implementations of the base station 28 and the device 22. In at least one example case, the base station 28 can be understood as an example of the node 10 illustrated in FIG. 3 and the device 22 can be understood as an example of the node 12 in the same illustration.

The device 22 includes communication circuitry 40 that is configured for wireless communication in the network 20. In an example embodiment, the communication circuitry 40 comprises or includes RF transceiver circuitry 42 configured for radio communications in accordance with one or more applicable air interface protocols.

The device 22 further includes processing circuitry 46 that is operatively associated with the communication circuitry 40. The processing circuitry 46 is configured to receive, via the communication circuitry 40, a resource identifier from a network node in the network 20, e.g., to receive the resource identifier via a downlink transmission by a base station 28 in the network 20. If the resource identifier was received in a device-specific message, the processing circuitry 46 is configured to use the resource identifier to identify a corresponding radio resource within an allocated bandwidth 18. However, if the resource identifier was not received in a device-specific message, the processing circuitry 46 is configured to translate the resource identifier and use the translated resource identifier to identify the corresponding resource within the allocated bandwidth 18 of the device 22.

In either case, the resource identifier or the translated resource identifier identify the same corresponding radio resource, and the processing circuitry is configured to transmit or receive on the corresponding radio resource, via the communication circuitry 40. Whether the device 22 transmits or receives on the corresponding radio resource depends, for example, on the type of message in which the resource identifier is received, or on the context in which the resource identifier is received.

Resource identifiers not received in device-specific messages comprise values expressed in a first resource referencing scheme that is referenced to an overall bandwidth 14 and resource identifiers received in device-specific messages comprise values expressed in a second resource referencing scheme that is referenced to the allocated bandwidth 18 of the device 22. Correspondingly, the processing circuitry 46 is configured to translate resource identifiers expressed using the first resource referencing scheme by using mapping information that relates the first resource referencing scheme to the second resource referencing scheme.

In an example embodiment, or an example case, the processing circuitry 46 is configured to receive the resource identifier in a downlink control message transmitted by the base station 28 on radio resources within a common search space used for sending downlink control messages to multiple wireless communication devices (which may be of the same or different types), and correspondingly determine that the resource identifier was not received in a device-specific message and, therefore, requires translation.

In at least one example embodiment or case, the processing circuitry 46 is configured to receive the mapping information from the network 20, for translating resource identifiers from the first resource referencing scheme into the second resource referencing scheme. For example, the processing circuitry 46 is configured to receive the mapping information in conjunction with receiving configuration information defining the allocated bandwidth. The processing circuitry 46 is configured to, for example, receive the mapping information implicitly via a command sent by the network 20 to configure the allocated bandwidth 18. Here, a position or offset of the allocated bandwidth 18 in the overall bandwidth 14 indicates a mapping function to be used by the device 22 for translating resource identifiers from the first resource referencing scheme to the second resource referencing scheme.

In a further example, the radio resource corresponding to the received resource identifier belongs to a set of radio resources pointed to by the resource identifier. The set of radio resources carry data or control information, and the processing circuitry 46 is configured to decode the data or control information from the set of radio resources. For example, the base station 28 sends a downlink control message that targets a plurality of devices, including the device 22, and the resource identifier identifies a set of radio resources within the overall bandwidth 14. The identified resources commonly fall within the respective allocated bandwidths 18 of the targeted plurality of devices.

The communication circuitry 40 of the device 22 may also support Device-to-Device (D2D) communications directly with other devices 22, and may include WLAN communications, Bluetooth communications, Near-Field Communication (NFC), etc. Further, the processing circuitry 46 comprises fixed circuitry, or programmed circuitry, or a mix of fixed and programmed circuitry.

In at least one embodiment, the processing circuitry 46 comprises one or more microprocessors, Digital Signal Processors (DSPs), Field Programmable Gate Arrays (FP- GAs), Application Specific Integrated Circuits (ASICS), or other digital processing circuitry. In at least one such embodiment, the processing circuitry 46 is configured according to the teachings herein based on the execution of computer program instructions stored in one or more computer programs 50 held in storage 48 that is included in or associated with the processing circuitry 46. The storage 48 may further hold one or more items of configuration data 52 that is pre-provisioned and/or dynamically acquired by the processing circuitry 46.

In one or more embodiments, the storage 48 comprises one or more types of computer-readable media, such as a mix of non-volatile memory circuits or disk storage and volatile, working memory. Non-limiting examples of non-volatile storage include Solid State Disk (SSD) storage, FLASH, and EEPROM, while non-limiting examples of the volatile, working memory includes DRAM or SRAM.

FIG. 6 also illustrates example implementation details for the base station 28, as an example of the network node 10 introduced in FIG. 3. The base station 28—and, more generally, the network node 10—includes communication circuitry 60. The particular circuitry included in the communication circuitry 60 depends upon the type of network node involved.

In the illustrated example, the communication circuitry 60 includes RF transceiver circuitry 62 and network node ("NW") interface circuitry 64. The RF transceiver circuitry 62 includes physical-layer circuitry for transmitting and receiving wireless signals, e.g., over the applicable air interface supporting communication with wireless devices operating in the network. The network node interface circuitry 64 comprises, for example, network interface circuitry for communicatively coupling the base station 28 to one or more other base stations and/or other nodes in the network 20.

The base station 28 further includes processing circuitry 66 that is operatively associated with the communication circuitry 60. The processing circuitry 66 is configured to transmit a resource identifier in a message that is not specific to a wireless communication device 22 operating with an allocated bandwidth 18. For example, the base station 28 transmits a message intended for a plurality of devices, rather than being targeted to a specific device. While "transmit" in this context comprises wireless transmission via the communication circuitry 60, in other embodiments a network node 10 may transmit the resource identifier over a computer network link or other an inter-node interface, for wireless transmission.

In either case, the resource identifier identifies a radio resource to be used by the wireless communication device, where the resource identifier is expressed according to a first resource referencing scheme that is referenced to an overall bandwidth 14 that contains the allocated bandwidth 18 of the device 22. Correspondingly, the processing circuitry 66 is configured to provide mapping information to the device 22. The mapping information enables the device 22 to translate the resource identifier from the first resource referencing scheme into a second resource referencing scheme that is used by the device 22 for referencing radio resources within the allocated bandwidth 18. For example, the processing circuitry 66 is configured to provide the mapping information by explicitly signaling the mapping information to the device 22, via the communication circuitry. Non-limiting examples of explicit signaling include sending one of: Radio Resource Control (RRC) signaling, a Medium Access Control (MAC) element, and control-channel signaling.

In one or more other embodiments or instances, the processing circuitry 66 is configured to provide the mapping information to the device 22 implicitly, based on allocating the allocated bandwidth at an offset or position within the overall bandwidth. The offset or position is associated with a corresponding mapping function known to the wireless communication device, for mapping from the first resource referencing scheme into the second resource referencing scheme.

In one example of transmitting a resource identifier in a message that is not specific to the device 22, the processing circuitry 66 is configured to transmit a control channel within a common search space that is searched by a plurality of wireless communication devices for downlink control information. Here, the plurality of wireless communication devices includes the device 22 and the control channel conveys or otherwise indicates the resource identifier.

In this context, it shall be understood that the device 22 is configured to translate resource identifiers received in messages that are not specific to the device 22 and identify the corresponding radio resources within the allocated bandwidth 18 using the translated resource identifiers. Conversely, the device 22 is configured to use, without translation, resource identifiers received in messages that are specific to the device 22. The processing circuitry 66 of the network node 10/base station 28 is, in at least some embodiments, configured to enable the device 22 to differentiate between device-specific and non-device-specific messages by using a compact message format for transmitting device-specific messages to the device 22, as compared to a message format used for transmitting non-device-specific messages.

In at least some embodiments, the first resource referencing scheme comprises a first numbering scheme for numbering radio resources within the overall bandwidth, and the second resource referencing scheme comprises a second numbering scheme for numbering radio resources within the allocated bandwidth. The mapping information, therefore, enables the device 22 to translate numbers in the first numbering scheme into corresponding numbers in the second numbering scheme. In these and in other embodiments, the processing circuitry 66 may be configured to determine the mapping information in dependence on where the allocated bandwidth 18 is positioned or located within the overall bandwidth 14.

The processing circuitry 66 comprises programmed circuitry, fixed circuitry, or some combination of programmed and fixed circuitry. In an example implementation, the processing circuitry includes one or more microprocessor-based circuits or other digital processing circuitry that is specially adapted or otherwise configured based on the execution of computer program instructions contained in one or more computer programs. In a corresponding implementation example, the processing circuitry 66 includes or is associated with storage 68 comprising one or more types of computer-readable media that store the one or more computer programs 70 along with any applicable configuration data 72.

Figure 7:
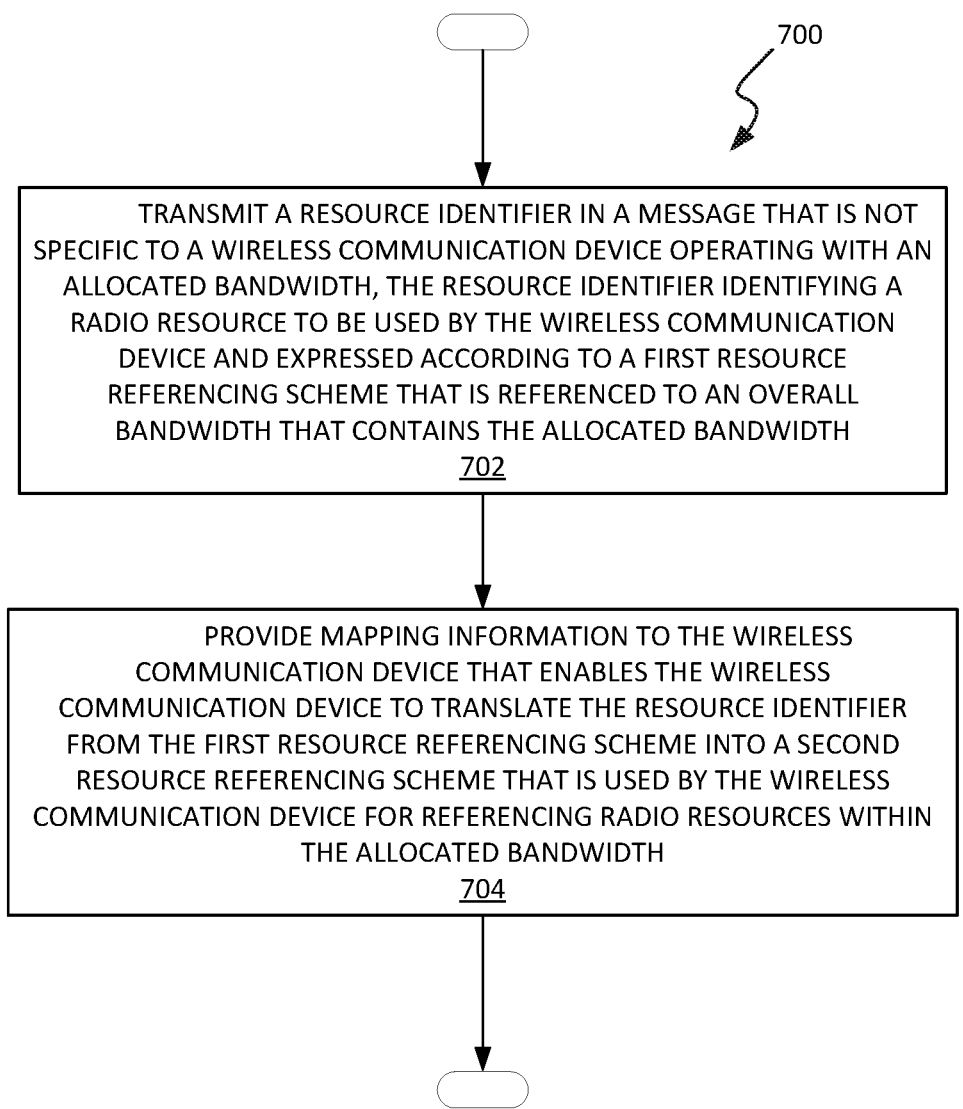
FIG. 7 is a logic flow diagram of one embodiment of a method of processing at a network node.

FIG. 7 illustrates a method 700 of operation performed by a network node 10, such as the base station 28. For this method and other methods illustrated herein, the method may be carried out in an order different than that suggested by the illustration. Further, it will be appreciated that the disclosed method(s) may be repeated on a triggered or as-needed basis, e.g., when a device 22 initially connects to a network 20, when a device 22 is handed over from one base station 28 to another, or whenever the bandwidth allocation 18 of a device 22 is changed for any reason.

The method 700 includes transmitting (block 702) a resource identifier in a message that is not specific to a wireless communication device 22 operating with an allocated bandwidth 18, where the resource identifier identifies a radio resource to be used by the device 22 and is expressed according to a first resource referencing scheme that is referenced to an overall bandwidth 14 that contains the allocated bandwidth 18. The method 700 further includes providing (block 704) mapping information to the device 22 that enables the device 22 to translate the resource identifier from the first resource referencing scheme into a second resource referencing scheme that is used by the device 22 for referencing radio resources within the allocated bandwidth 18.

Providing the mapping information comprises, for example, explicitly signaling the mapping information to the device. Examples of explicit signaling include sending RRC signaling, sending MAC element, and sending control-channel signaling. Alternatively, the method 700 includes providing the mapping information implicitly. For example, providing the mapping information implicitly comprises allocating the allocated bandwidth 18 at an offset or position within the overall bandwidth 14 that is associated with a corresponding mapping function known to the device 22, for mapping from the first resource referencing scheme into the second resource referencing scheme. Thus, indicating the allocated bandwidth 18 implicitly indicates the mapping function to be used by the device 22.

In an example of transmitting a resource identifier in the message that is not specific to a particular device, the base station 28 or other network node 10 in question transmits a control channel within a common search space that is searched by a plurality of devices for downlink control information. The plurality of devices includes the device 22 in question and the involved search space occupies a portion of the overall bandwidth 14 that is common to the respective allocated bandwidths 18 of the involved devices.

Supporting such network-side operations, the device 22 is configured to translate resource identifiers received in messages that are not specific to the device 22 and identify the corresponding radio resources within the allocated bandwidth 18 using the translated resource identifiers. However, the device 22 uses, without translation, resource identifiers received in messages that are specific to the device 22. Thus, in at least one embodiment, the method 700 includes enabling the device 22 to differentiate between device-specific and non-device-specific messages by using a compact message format for transmitting device-specific messages to the device 22 within a device-specific search space in the allocated bandwidth 18, as compared to a message format used for transmitting non-device-specific messages in a common search space within the allocated bandwidth 18.

Notably, the method 700 may further include, and a network node 10/base station 28 may be further configured to selectively send resource identifiers using a first resource referencing scheme relating to an overall bandwidth 14 or a second resource referencing scheme relating to an allocated bandwidth 18 within the overall bandwidth 14. For example, when sending a resource identifier that has applicability to more than one device operating in the network 20, the network node 10/base station 28 sends the resource identifier as expressed in the first resource referencing scheme. Doing so allows each receiving device to translate the resource identifier, as needed, into the particular referencing scheme in use at the device—e.g., different devices have different allocated bandwidths 18, such that the different devices perform a different translation of the resource identifier so that the corresponding radio resource is correctly identified within their respective allocated bandwidths 18. This approach saves the network 20 from having to tailor the transmission to the particular bandwidth allocations of the receiving devices.

On the other hand, when sending a resource identifier that is targeted to one specific device 22, the network node 10/base station 28 sends the resource identifier as expressed in the resource referencing scheme applicable to the device 22. Doing so promotes efficiency. For example, resource identifiers expressed in the resource reference applicable to the targeted device 22 may be smaller than resource reference identifiers applicable to the overall bandwidth 14. Further, sending the resource identifier expressed in the referencing scheme in use at the targeted device 22 avoids the targeted device 22 from having to perform the translation.

Figure 8:
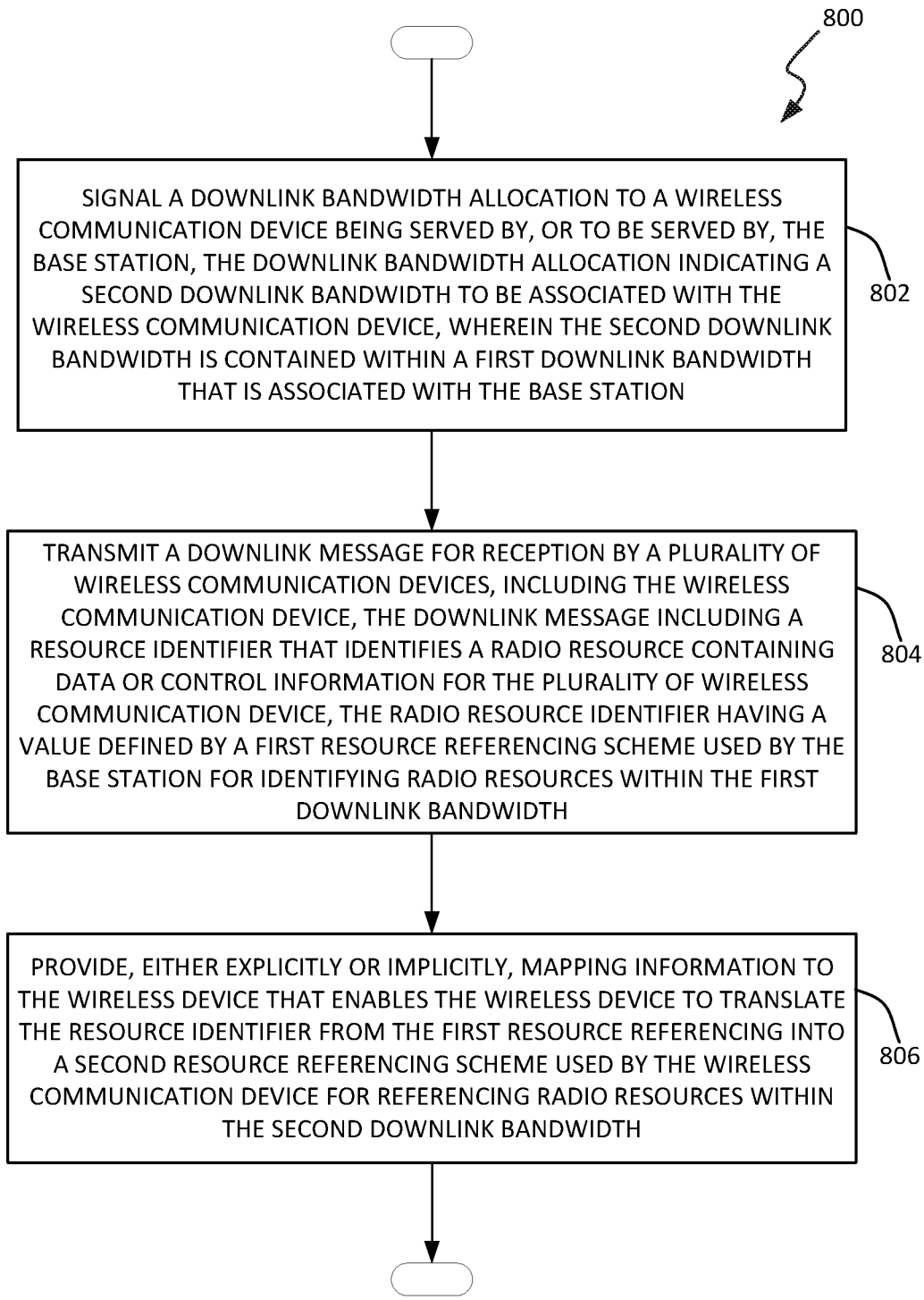
FIG. 8 is a logic flow diagram of one embodiment of a method of processing at a network node.

FIG. 8 illustrates a method 800 operation in a base station 28, such as in the base station 28 shown in FIG. 6. The method 800 can be understood as a detailed example or extension of the method 700.

The method 800 includes signaling (Block 802) a downlink bandwidth allocation to a device 22 being served by, or to be served by, the base station 28. The downlink bandwidth allocation indicates a second downlink bandwidth to be associated with the device 22, where the second downlink bandwidth is contained within a first downlink bandwidth that is associated with the base station 28. Here, the first downlink bandwidth corresponds to the earlier described overall bandwidth 14 and the second downlink bandwidth corresponds to the earlier described allocated bandwidth 18.

The method 800 further includes transmitting (Block 804) a downlink message for reception by a plurality of devices 22, including the aforementioned device 22. The downlink message includes a resource identifier that identifies a radio resource containing data or control information for the plurality of devices 22. The radio resource identifier has a value defined by a first resource referencing scheme used by the base station 28 for identifying radio resources within the first downlink bandwidth, and the method 800 further includes providing (Block 806), either explicitly or implicitly, mapping information to the device 22 that enables the device 22 to translate the resource identifier from the first resource referencing scheme into a second resource referencing scheme used by the device 22 for referencing radio resources within the second downlink bandwidth.

With the above non-limiting examples in mind, in at least one embodiment, a network node 10 transmits a device-specific offset to a device 22 operating in a network 20. By way of example, the device-specific offset is transmitted via RRC messaging, as a MAC element, in control signaling, or by another mechanism. However conveyed from the network 20 to the device 22, the device-specific offset can be understood as providing or relating to mapping information that relates the resource numbering or referencing schemed used by the device 22 for referencing radio resources within an allocated bandwidth 18, to the resource numbering or referencing scheme used by the network 20 for referencing radio resources within an overall bandwidth 14 that contains the allocated bandwidth 18.

Here, it will be understood that the term "bandwidth" as a matter of convenience is being used to connote both the amount or span and location of frequency resources. Thus, saying that a base station 28 is associated with a downlink bandwidth of 100 MHz, for example, can be understood as saying that the base station is associated with 100 MHz of radio frequency spectrum in a particular range of absolute frequency. Correspondingly, a device 22 operating in the coverage area of the base station operates in a particular sub-band of the base station's frequency band, which sub-band is referred to as the allocated bandwidth 18 associated with the device. In general, a particular bandwidth may be defined by or contain a corresponding number of subcarriers having a defined spacing and each representing a frequency resource within the bandwidth.

In one or more embodiments, the network 20 transmits the device-specific offset to a given device 22 whenever needed, e.g., whenever the bandwidth allocation of the device 22 changes or the mapping must otherwise be updated. Preferably, the device-specific offset is transmitted in the same message used to configure the location of the device's allocated bandwidth 18. However, it is also contemplated herein that the device-specific offset can be signaled to a device 22 on an implicit basis. For example, based on known relationships, the device 22 may derive the device-specific offset from the command that (re)allocates the device's bandwidth 18 within the overall bandwidth 14, which may be the system carrier bandwidth of the base station 28 providing the involved downlink carrier.

As noted, allowing the devices to operate with device-specific resource referencing schemes allows device-specific resource identifiers to be expressed in the "smaller" number spaces associated with the typically much smaller bandwidth allocations associated with the respective devices 22. Note that the device-specific offset for a given device 22 can be calculated by the network 20 in relation to any desired reference point within (or even outside) the system carrier bandwidth. For example, the offset may be calculated with respect to the lowest-numbered Resource Block (RB) within the system carrier bandwidth, or with respect to the center of the bandwidth, or with respect to the highest-numbered RB. As a further alternative, the device-specific offset may be referenced to the frequency location of a particular signal (e.g., a synchronization signal or synchronization signal block SSB or Physical Broadcast Channel, PBCH), or may be referenced to a frequency used by the device 22 for random access, or referenced to the location of the signaling used to convey the device-specific offset to the device 22. As a further alternative, the device-specific offset can be calculated to any arbitrary frequency, RB, or defined signal.

Figure 9:
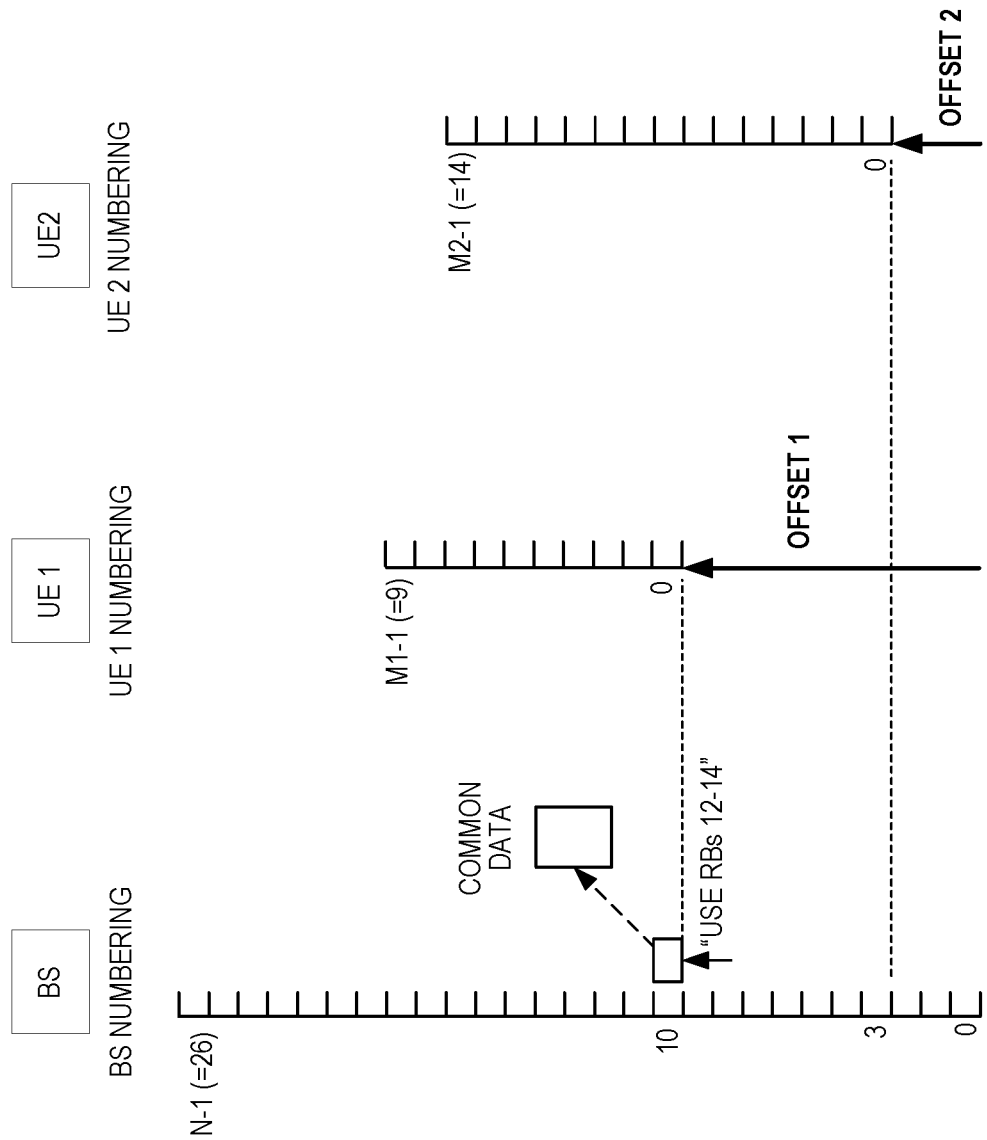
FIGS. 9-12 are diagrams of example bandwidth allocations to respective wireless communication devices operating within an overall downlink bandwidth associated with a network base station, and corresponding resource reference translation schemes.

FIG. 9, for example, shows an approach where a base station (BS) 28 or other network node 10 uses a first resource referencing scheme to identify radio resources within a set of radio resources. Specifically, the base station 28 uses a first numbering scheme that identifies 27 RBs using the numbers 0 to 26. The 27 RBs represent an overall bandwidth for purposes of this example, and a first device 22, denoted as UE1, is allocated a subset of that bandwidth encompassing RBs 10-19 (according to the BS numbering). Similarly, a second device 22, denoted as UE 2, is allocated another subset of the overall bandwidth, encompassing RBs 3-17 (according to the BS numbering). Each UE uses its own resource referencing scheme, e.g., the UE 1 identifies the resources within its allocated bandwidth using a numbering scheme going from 0 to 9, while the UE 2 identifies the resources within its allocated bandwidth using a numbering scheme going from 0 to 14.

Thus, relative to the "start" of the BS numbering scheme, the numbering scheme used by the UE 1 is offset by 10, and the numbering scheme used by the UE 2 is offset by 3. The base station 28 can, therefore, provide each of the UEs with a mechanism for translating from the base station numbering scheme into the numbering scheme used by the UE, by providing the UE with the applicable offset information. Such information is provided, for example, as part of configuring the bandwidth allocation for the UE and may be signaled to the UE along with related configuration signaling.

Here, the UE-specific offsets can be understood as UE-specific mapping information that enables a given UE to translate a resource identifier from a first resource referencing scheme used by the base station 28 for identifying radio resources within a first downlink bandwidth associated with the base station 28 into a second resource referencing scheme used by the UE for identifying radio resources within a second downlink bandwidth associated with the UE. In this example, the first downlink bandwidth comprises the 27 RBs, while the second downlink bandwidth for the UE 1 comprises the 10 RBs allocated to the UE 1. Similarly, the second downlink bandwidth for the UE 2 comprises the 15 RBs allocated to it. The mapping information for the UE 1 comprises the "Offset 1=10" information and the mapping information for the UE 2 comprises the "Offset 2=3" information.

Thus, if the base station 28 transmits a message using RB 10—in a given transmission time interval or instant—and that message includes a resource identifier pointing to RBs 12-14 using the first numbering scheme, the UE 1 would subtract Offset 1=10, to get RBs 2-4 in its own numbering scheme. Similarly, the UE 2 would subtract Offset 2=3 from 12-14, and would get RBs 9-11 in its own numbering scheme. The "mapping function" used by each UE might thus be subtracting a UE-specific offset from the RB numbers identified in the message, which may be a Physical Downlink Control Channel, PDCCH, transmission by the base station 28, for example.

In another embodiment, the modification might be the addition of the UE-specific offset to the RB numbers indicated by the base station 28. In both examples, a linear resource block numbering is assumed. Other resource block numbering schemes such as positive and negative resource block numbers relative to a center frequency or a spiral resource block numbering starting in the center and spiraling outwards are other possible numbering schemes. The teachings herein are not limited to a specific numbering scheme and it will be appreciated that the mapping information provided to a UE and the corresponding mapping function used by the UE for translating base-station resource reference into UE-specific resource references will depend on the resource referencing schemes in use.

Whereas base stations in LTE were referred to as eNBs, radio access nodes in 5G systems may be referred to as "gNBs." A gNB operating according to an embodiment of the teachings herein provides mapping information to respective UEs, enabling each UE to translate the resource identifiers from the resource referencing scheme used by the gNB for the radio resource contained within a first bandwidth, into UE-specific resource identifiers that are mapped into the resource subsets allocated to or associated with each UE. Of course, the gNB may transmit UE-specific messages that contain resource identifiers that are already expressed in terms of the UE-specific referencing scheme, while sending resource identifiers in messages intended for receipt by more than one UE that are expressed in terms of the gNB's referencing scheme.

In at least one embodiment herein, a gNB or other base station 28 uses different message "sizes" when sending resource identifiers in a common search space versus a device-specific (UE-specific) search space. That is, when sending a resource identifier in a message transmitted in a common search space for receipt by more than one UE, the resource identifier is expressed in terms of the overall resource space—i.e., the resource space represented by the overall bandwidth at issue. However, when sending a resource identifier in a message transmitted in a device-specific search space for receipt by a particular device, the resource identifier is expressed in terms of the allocated resource space—i.e., the resource space represented by the bandwidth allocation associated with the device. Because the allocated bandwidth may be much smaller than the overall bandwidth, it takes fewer bits to uniquely identify resources—e.g., RBs—within the allocated bandwidth than is required for identifying those same resources within the overall bandwidth.

Complementing the different numbers of bits needed to identify resources in the overall bandwidth at issue versus the allocated bandwidth associated with a given device 22, the devices 22 may be configured to handle the different message sizes. For example, a UE searching for a PDCCH message in a common search space may assume a different resource allocation field size than when it searches for a PDCCH message in a UE-specific search space. The UE may also assume a different Downlink Control Information (DCI) size in this case. Also, note that it is not necessary to define device-specific offsets in relation to an anchor equal to RB 0 (in base-station numbering). The anchor may be arbitrary and need not be known at the devices 22, as long as it is consistent for all devices 22 served by the base station 28 at issue. Different base stations 28 may have different anchors.

Figure 10:
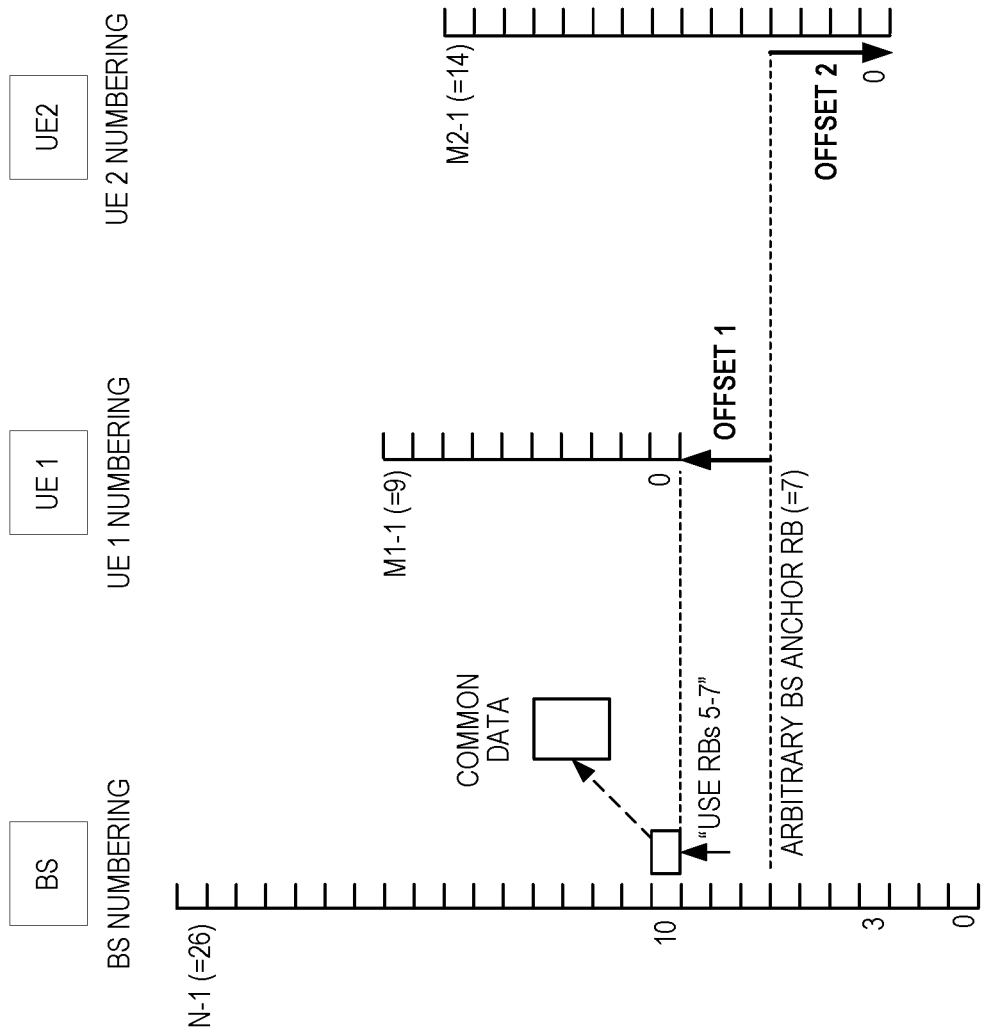

FIG. 10 illustrates an example embodiment or configuration where the BS has chosen RB 7 to be the anchor. This choice is reflected in that the Offset 1=3 and the Offset 2=−4. Thus, offsets may be negative. These UE-specific offsets are transmitted to the UEs, e.g., upon the semi-static configuration of their bandwidth locations within the larger bandwidth.

FIG. 10 also illustrates the transmission of Downlink Control Information (DCI) by the BS, which identifies a data region of common interest to the UEs 1 and 2, and which identifies the involved RBs using the base-station resource referencing scheme. Notably, despite expressing the common data-region RBs in terms of its own resource numbering scheme, the base station does adjust for the fact that RB 7 serves as the reference for the UE-specific offsets. Assuming that the common data-region RBs are numbered 12-14 in the base-station scheme, the resource identifier sent by the base station 28 in the common PDCCH identifies RBs 5-7. The UE 1 subtracts Offset 1 (=3) to yield RBs 2-4 within its own resource space, and the UE 2 subtracts Offset 2 (=−4) from 5-7 to obtain RBs 9-11 within its own resource space. Notably, as seen in conjunction with FIG. 7, both offsetting schemes result in the UEs 1 and 2 resolving the resource identifiers correctly, such that both UEs 1 and 2 properly identify the RBs 12-14 (in absolute BS numbering) as being the common data-region RBs pointed to in the PDCCH message they receive from the BS in the common search space.

FIG. 10 demonstrates that a base station 28 can choose an arbitrary anchor point within the overall bandwidth of interest, and the choice is transparent to the devices 22 being served, as the base station 28 can adjust the value(s) of the resource identifiers it sends in common messages, in dependence on where the anchor or reference point for the UE-specific offsets is located within the overall bandwidth.

By way of example, the anchor may be the location of BS RB 0 or RB N−1, or the center RB or the center frequency of the overall bandwidth or the location of a sync signal or synchronization signal block SSB or the Physical Broadcast Channel (PBCH) or any other location. In at least one embodiment, the base station 28 chooses the anchor to minimize the number of bits needed to encode the offsets.

The encoding of the offsets is also considered herein. The encoding resolution might be different from the single-RB resolution that the devices 22 use. For example, rather than expressing offsets at the RB resolution, the offsets may be expressed more coarsely, such as in multiples of RBs, rather than in single-RB increments. In an example, the device-specific offsets are expressed in terms of L times (some number of RBs), where L is an integer. Such an approach saves signaling bits but does force the base station 28 to use a coarser grid on which to allocate devices 28.

Now consider a scenario where the network 20 reconfigures a device 22 to another part of the overall bandwidth 14—i.e., where the allocated bandwidth 18 of the device 22 is "moved" within the overall bandwidth at issue. Such changes may occur, for example, as a function of network load or device mobility resulting in a change in serving base stations for the device 22. Changing the allocated bandwidth location changes the device-specific offset, which can more generally be stated as saying that the mapping function to be used by the device 22 for translating from the base-station resource referencing scheme into the device-specific resource referencing scheme changes.

Hence, the offset or other mapping information used by the device 22 must be updated to reflect the changed allocation location and such information can be provided to the device 22 as a parameter in RRC reconfiguration or handover signaling. More generally, the device 22 is provided with, or the device 22 derives, new mapping information as needed.

Figure 11:
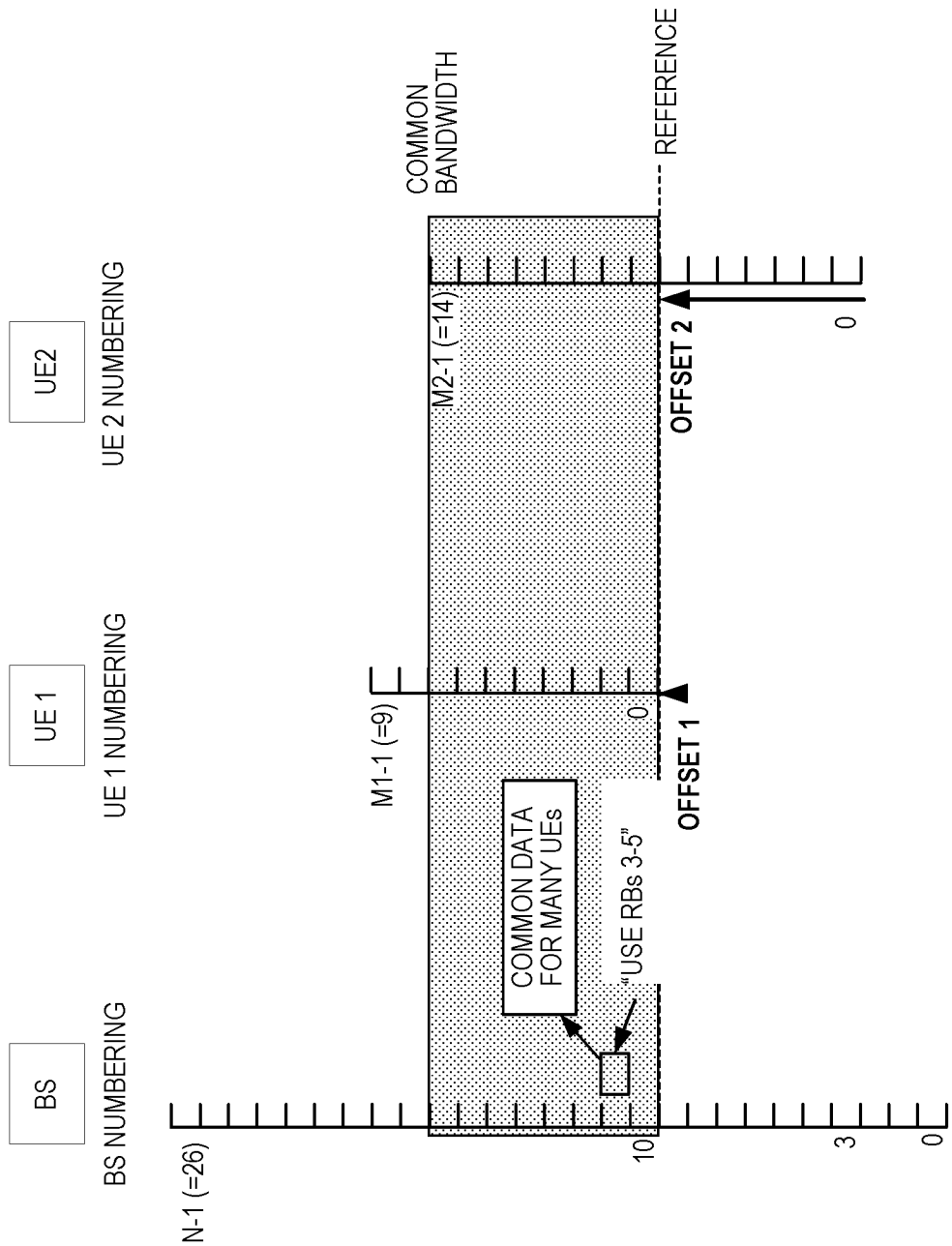

FIG. 11 illustrates a further variation contemplated herein. In this example embodiment or instance, the offset that relates device-specific resource numbering to the base-station resource numbering is defined relative to the allocated bandwidth of each device 22 being supported. The offset is relative to a reference that is preferably within a common bandwidth of all devices 22 that should be capable of receiving a common message from the base station 28.

In the diagram the reference is selected at the bottom of the common bandwidth. However, other positions are possible as well. In the example, the Offset 1=0 and the Offset 2=7. The base station 28 references scheduled resources relative to the reference, although it does so using the numbering scheme associated with the overall bandwidth 14. For example, to reference RBs 13-15 (in the BS coordinate system) in a common message sent to the UEs 1 and 2, the BS would signal 3-5. While still expressed within the BS resource referencing scheme, these resource identifier values are relative rather than absolute—i.e., they are relative to the RB=10 anchor point within the overall bandwidth at issue.

Correspondingly, to properly map the resource identifier values from the BS scheme into the applicable device-specific scheme, the UE 1 adds Offset 1 (0) to them, which results in the UE 1 decoding data from RBs 3-5 within its own referencing scheme. Of course, these values "point" to RBs 13-15 within the overall bandwidth 14, as is proper. Similarly, the UE 2 adds Offset 2 (7) to the values signaled by the BS, which results in the UE 2 decoding data from the correct RBs.

Figure 12:
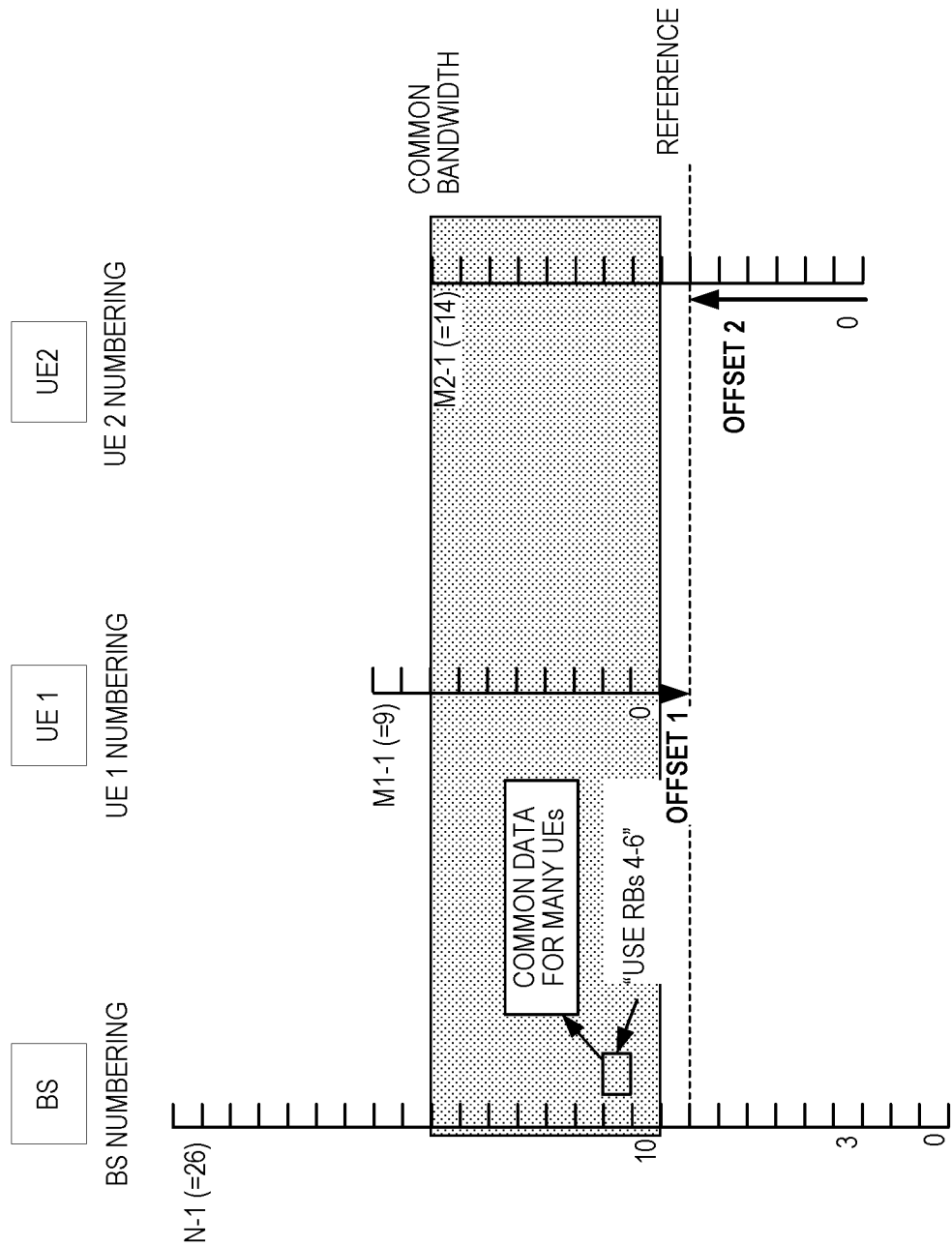

Notably, the reference does not necessarily have to be within the common bandwidth and FIG. 12 illustrates an example of such an approach. Here, the Offset 1=−1 and the Offset 2=6. To address the same bandwidth as referenced in the preceding example, the base station 28 signals resource identifiers 4-6. The UE 1 adds Offset 1 (−1) to the signaled values and uses resources 3-5 in its local referencing or coordinate system. The UE 2 adds Offset 2 (6) to the signaled values and use resources 10-12 in its local coordinate system. If the offset reference is outside the common bandwidth, a potentially larger field is needed for the resource allocation assignment. For example, in FIG. 11, only three bits were needed, while in FIG. 12 4 bits are needed.

One advantage of the approach seen in FIG. 11 is that signaling in the common search space only requires as many bits as are needed to address the common bandwidth while the approach seen in FIG. 10 requires the resource allocation field to accommodate the number of bits needed for identifying resources within the overall bandwidth at issue. Of course, the approach illustrated in FIG. 11 requires a reconfiguration of the UE-specific offsets if the common bandwidth changes, e.g. due to bandwidth allocation change of a single UE. Alternatively, the reference may be kept constant but in this case the resource allocation field size may increase.

Among other advantages, the teachings herein allow for full flexibility of per-device bandwidths while enabling the smallest possible payload for signaling device-specific RB allocations and while allowing for non-ambiguous signaling of common-space RB allocations. In an example implementation, a device 22 is configured with a bandwidth allocation (also referred to as a frequency allocation) that occupies a portion of the bandwidth (frequency range) that a serving base station 28 uses to serve any number of devices 22.

The device 22 is configured to receive a device-specific offset, and to receive a downlink control message in a common search space. The message includes a resource identifier, e.g., a data region location indicator (resource block assignment), and the device 22 is configured to identify a set of resource blocks based on the data region location indicator and the device-specific offset. Further, the device 22 is configured to receive a data codeword in the data region in the identified set of resource blocks—that is, the device 22 is configured to decode the data codeword from the correctly-identified radio resources.

The device 22 uses different formulas—mapping functions—to calculate the resource block(s) to be used for reception or transmission depending whether the involved DCI has been received in a common search space used by multiple devices 22, or a device-specific search space that is specific to the device 22. The serving base station 28 may use different resource block field sizes (and thus potentially also different DCI sizes) for DCI in common search spaces versus DCI in the UE-specific search space, and a device 22 in such embodiments is configured to correctly receive (process) the differently-sized resource block fields and/or DCI.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of operation by a wireless communication device with respect to a wireless communication network, the method comprising:
receiving a resource identifier from a network node in the wireless communication network, the resource identifier indicating a value that maps directly to numbered radio resources within a defined portion of radio frequency spectrum, if the resource identifier is not received in a common search space, and maps indirectly to the numbered radio resources according to an offset, if the resource identifier is received in a common search space; and
transmitting or receiving on the numbered radio resources.

2. The method of claim 1, wherein the indicated value is a starting number and wherein, if the resource identifier was not received in a common search space, the numbered radio resources are identified by interpreting the starting number as indicating a starting physical resource block within a set of physical resource blocks that are numbered according to a numbering scheme referenced to the defined portion of radio spectrum.

3. The method of claim 2, wherein, if the resource identifier was received in a common search space, the numbered radio resources are identified by interpreting the starting number plus the offset, as indicating the starting physical resource block.

4. The method of claim 1, wherein the defined portion of radio spectrum spans a subset of physical resource blocks within an overall set of physical resource blocks spanned by an overall bandwidth, and wherein the numbered radio resources are included in the subset of physical resource blocks.

5. The method of claim 1, wherein the numbered radio resources include a starting numbered radio resource, and wherein the starting numbered radio resource is determined from the indicated value without the offset, if the resource identifier was not received in a common search space, and wherein the starting numbered radio resource is determined from the indicated value plus the offset, if the resource identifier was received in a common search space, and wherein remaining ones of the numbered radio resources are identified according to mapping information received from the network node.

6. A wireless communication device comprising:
communication circuitry configured for wireless communication in a wireless communication network; and
processing circuitry operatively associated with the communication circuitry and configured to:
receive a resource identifier from a network node in the wireless communication network, the resource identifier indicating a value that maps directly to numbered radio resources within a defined portion of radio frequency spectrum, if the resource identifier is not received in a common search space, and maps indirectly to the numbered radio resources according to an offset, if the resource identifier is received within a common search space; and
transmit or receive on the numbered radio resources.

7. The wireless communication device of claim 6, wherein the indicated value is a starting number and wherein, if the resource identifier was not received in a common search space, the numbered radio resources are identified by interpreting the starting number as indicating a starting physical resource block within a set of physical resource blocks that are numbered according to a numbering scheme referenced to the defined portion of radio spectrum.

8. The wireless communication device of claim 7, wherein, if the resource identifier was received in a common search space, the numbered radio resources are identified by interpreting the starting number plus the offset, as indicating the starting physical resource block.

9. The wireless communication device of claim 6, wherein the defined portion of radio spectrum spans a subset of physical resource blocks within an overall set of physical resource blocks spanned by an overall bandwidth, and wherein the numbered radio resources are physical resource blocks included in the subset.

10. The wireless communication device of claim 6, wherein the numbered radio resources include a starting numbered radio resource, and wherein the starting numbered radio resource is determined from the indicated value without the offset, if the resource identifier was not received in a common search space, and wherein the starting numbered radio resource is determined from the indicated value plus the offset, if the resource identifier was received in a common search space, and wherein remaining ones of the numbered radio resources are identified according to mapping information received from the network node.

* * * * *